Dec. 26, 1939.  H. SINCLAIR ET AL  2,184,533
POWER TRANSMISSION MECHANISM
Filed April 4, 1938   3 Sheets-Sheet 1

Dec. 26, 1939.  H. SINCLAIR ET AL  2,184,533
POWER TRANSMISSION MECHANISM
Filed April 4, 1938  3 Sheets-Sheet 2

Inventors
Harold Sinclair
Robert Cecil Clerk
per
Dean Fairbank & Hirsch
Attys Dec. 26, 1939.   H. SINCLAIR ET AL   2,184,533
POWER TRANSMISSION MECHANISM
Filed April 4, 1938   3 Sheets-Sheet 3

Inventors
Harold Sinclair
Robert Cecil Clerk
Dean Fairbank Hirsch
Attys

Patented Dec. 26, 1939

2,184,533

UNITED STATES PATENT OFFICE 2,184,533

POWER TRANSMISSION MECHANISM

Harold Sinclair, Kensington, London, and Robert Cecil Clerk, Egham, England, assignors to Hydraulic Coupling Patents Limited, London, England, a company of Great Britain Application April 4, 1938, Serial No. 199,900
In Great Britain April 8, 1937

21 Claims. (Cl. 74—262)

This invention relates to a power-transmission system of the kind driven by an internal-combustion engine and including a hydraulic power transmitter of the kinetic type in series with a mechanical change-speed gearing of the type having constantly meshed toothed wheels and gear-selecting clutches (or a reaction stop or stops where the gearing is planetary) of the friction type. The invention is especially, but not exclusively applicable to planetary change-speed gearing in which the reaction brake or brakes (and the gear-selecting clutch or clutches if provided) are of the electro-magnetic type in which metal-to-metal co-operating friction elements form part of the magnetic circuit of the controlling magnet. The Cotal gear is a well-known example of such electro-magnetically controlled gearing.

Gear-selecting friction clutches and brakes usually have to be compact and therefore operate at high specific loads, with the result, especially with clutches and brakes of the metal-to-metal type, that, if the engaging pressure is high, they are apt to grab in operation and thus cause harshness in gear-changing, while, if the engaging pressure is reduced enough to avoid grabbing, they are liable to slip excessively when taking up a torque load and to slip continuously under sustained high torque, which rapidly renders their friction surfaces unserviceable. Hence it is usual to provide powerful magnetization of the clutches and brakes of Cotal gears, sacrificing to some extent smoothness of engagement to durability.

An object of this invention is to provide an improved system in which this disadvantage is reduced or eliminated.

In a power-transmission system of the kind set forth it is sometimes, for example in a motor vehicle, required to provide an additional mechanical gearing, such as a reversing gear or an emergency low gear, which is changed when the vehicle is stationary by the disengagement and engagement of co-operating teeth. The hydraulic power transmitter will transmit a substantial drag torque when its output shaft is stalled and the impeller is idling; and since during changing of the reversing gear it is convenient not to interrupt the transmission of torque in the gearing that has the frictional gear-selecting devices, the drag torque will cause a frictional load on the toothed members of the reversing gear which is sufficient to resist or, at high idling speeds, to prevent their disengagement.

A further object of this invention is to provide a simple arrangement for reducing this difficulty.

The present invention makes use of a particular condition which occurs in the hydraulic power transmitter at the instant of cessation or reversal of torque therethrough. During such a change of torque, the vortex circulation in the working circuit breaks down, and is momentarily in a confused form mixed with any air that may be present. If torque is suddenly re-applied under these circumstances, the instantaneous torque-transmission capacity of the coupling is substantially lower than it will be when the form of the annulus of liquid or the vortex is reestablished.

According to this invention, the gearing is provided with a control member operable for selecting changes of gear, and the power control member of the engine (e. g., the throttle in a carburettor engine) is so connected to the selecting mechanism of the gearing as to cause or permit the execution of at least some of the possible selected gear-changes at or substantially at the instant when a cessation or reversal of torque is taking place in the hydraulic power transmitter, which is preferably a hydraulic coupling. The control member is preferably a preselector. If however, a directly selective control is used, the operator will have to bias it when the power control member is operated to cause a cessation or reversal of torque in the hydraulic power transmitter.

According to a further feature of this invention, a power transmission system of the kind set forth comprises additional mechanical gearing which is adapted to be driven by the hydraulic power transmitter and to be changed by the disengagement and engagement of co-operating teeth, and which is so arranged that, as its co-operating sets of intermeshing teeth are disengaged under torque load, with the driven shaft of the additional gearing at rest and the driving engine rotating, the driven part of the hydraulic power transmitter is permitted to rotate fractionally and so transmit energy which assists or effects the disengagement of the teeth. Thus the teeth of at least one of each pair of co-operating sets of teeth may be backed off, on the faces that transmit the drag torque, at such an angle as to assist or effect the disengagement of the teeth under drag torque. Alternatively, one of the co-operating toothed members which is slidable, through the agency of a control member, on an element of the gearing into and out of mesh with another toothed member, is so engaged with said element that it is constrained to move obliquely in relation thereto, in such a direction as to assist or effect the disengagement of said members under drag torque.

The invention will be further described, with reference to the accompanying drawings, as applied to a road motor vehicle having the engine coupled by a hydraulic coupling to a Cotal four-speed gearing, having a reversing gear on its input side.

Figures 1, 2, 3:
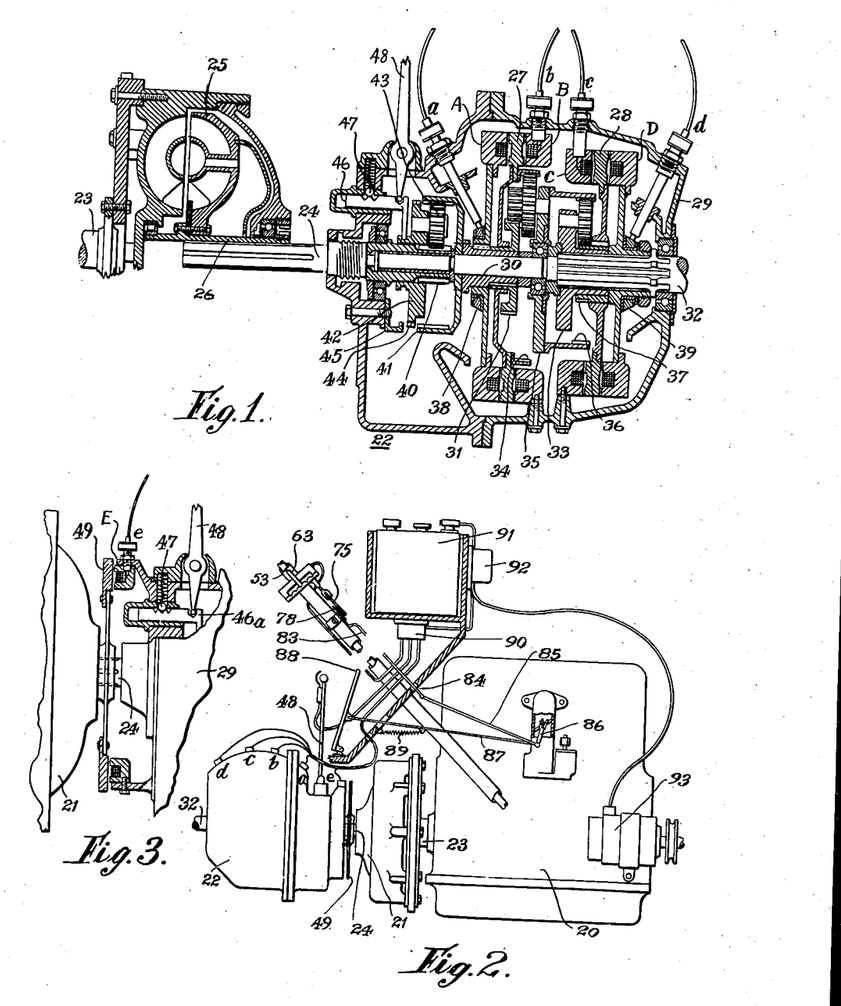
Fig. 1 is a sectional side elevation of the hydraulic coupling and the mechanical gearing.
Fig. 2 is a side view, partly in section, of a part of the vehicle showing the transmission mechanism from the opposite side to that shown in Fig. 1.
Fig. 3 shows a detail modification of Fig. 1, partly in section.

Referring to Figs. 1 and 2, the internal-combustion engine 20 has a hydraulic coupling 21 fixed to its crankshaft 23, and the coupling runner 25 is bolted to a hollow driven shaft 26, which is splined to the input shaft 24 of a four-speed Cotal planetary gearing which is generally denoted by 22 and which includes a planetary reversing gearing connected directly to its input shaft 24. This gearing, which is more fully described in United Kingdom Patent No. 444,899 with reference to Fig. 1 thereof, comprises four annular electro-magnets of which the magnets A and B co-operate with a common armature disk 27 and the magnets C and D with a common armature disk 28. The magnets B and C are fixed in the gear casing 29 and constitute reaction brake elements, while the magnets A and D constitute clutch elements; the magnet A is fixed to a driven hollow shaft 30 of the reversing gearing, to which is also fixed a sun wheel 31 of a compound planetary train; the magnet D is fixed to the driven shaft 32 of the system to which is also fixed the planet-carrier 33 of a simple planetary train. The armature 27 is fixed to the annulus gear 34 of the compound train. The planet carrier 35 of the compound is fixed to the annulus gear 36 of the simple train. The armature 28 is fixed to the sun wheel 37 of the simple train.

The exciting windings of the electro-magnets are grounded at one end and at the other end connected to terminals $a, b, c, d$, the connections to the rotatable magnets A and D being made through slip rings 38 and 39. This gearing yields four forward speeds, as follows:—

| Speed | Magnets energized |
|---|---|
| 1st | B C |
| 2nd | B D |
| 3rd | A C |
| 4th (direct) | A D |

The reversing gear includes a sun wheel 40 formed on the input shaft 24, an annulus gear 41 fixed to the shaft 30, and a planet-carrier 42 slidable and rotatable on the shaft 24 and carrying planet wheels such as 43 having a narrower tooth face width than the gears 40 and 41. The planet-carrier 42 is provided with teeth 44 engageable alternatively with the annulus 41 and a toothed sector 45 fixed to the gear casing. The planet-carrier is slidable under control of a reversing lever 48 acting through a selector rod 46 having two locating notches, representing respectively forward and reverse, and co-operating with a spring-loaded ball 47. When the planet-carrier 42 is engaged with the sector 45, the shaft 30 is constrained to rotate oppositely to and slower than the shaft 24. When the planet-carrier is engaged with the annulus 41, the shafts 24 and 30 are locked together.

Figure 7:
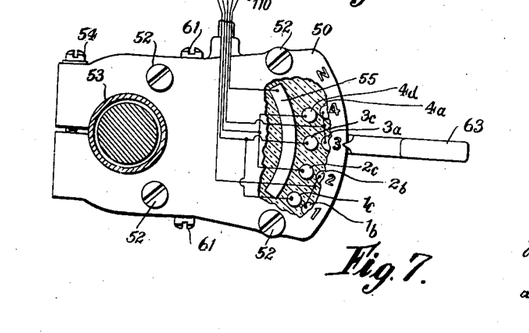
Fig. 7 is a plan of the controller, partly in section, as viewed from the top of Fig. 4.
Figure 8:
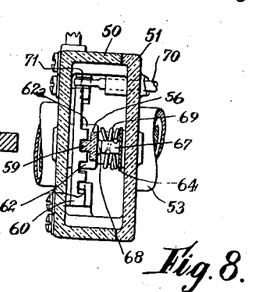
Fig. 8 is a section on the line 8—8 in Fig. 6.

The preselector controller (Figs. 3 to 8) includes a casing of moulded insulating material and consisting of upper and lower parts 50 and 51 which are clamped together by screws 52 and to the steering column 53 by screws 54. The upper part 50 is provided with an arcuate contact strip 55 and four pairs of contact studs. Each stud is denoted by a numeral and a letter, the numeral representing the gear speed and the letter the terminal of the Cotal gear to which the stud is electrically connected. An insulated brush arm 56 is pivotally mounted on a pin 57 journalled in the casing. The brush arm carries brushes 58 adapted to connect the contact strip 55 with the several pairs of contact studs alternatively. An interlocking tumbler 60, pivoted on screw pins 61 is provided with an arcuate flanged rim having three notches 62 (Fig. 8) adapted to engage a rib 59 on the brush arm 56 and lock this arm in the first, second and third speed positions (Fig. 7). A step 62a in the rim of the tumbler 60 allows the brush arm to move between neutral and the fourth speed position even when the tumbler is in its locking position. In this condition, however, the brush arm is prevented from moving from the fourth to a lower speed position.

A preselector handle 63 is fixed to a spring blade 64 in turn fixed to the pin 57. The handle 63 is provided with a rib 65 engageable in five notches 66 formed in the lower casing member 51 at positions corresponding to neutral and the four speeds. The preselector blade 64 is connected to the brush arm 59 by a coupling spring 69 (Figs. 4 and 5) consisting of a helix surrounding the pin 57 with its two ends crossed and thereafter normally disposed parallel to each other, one on each side of two studs 67 and 68 fixed respectively to the blade 64 and the brush arm 56. The ends of the spring resist movement away from each other and thus tend to keep the two studs 67 and 68 on the same radial line about the pin 57.

Figures 4, 5, 9:
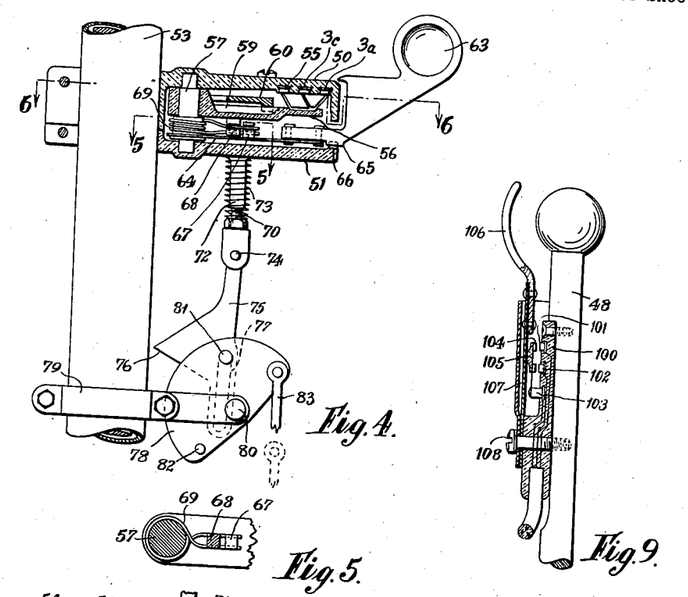
Fig. 4 is a sectional elevation of the preselector controller.
Figs. 5 and 6 are respectively sections on the lines 5—5 and 6—6 in Fig. 4.
Fig. 9 is a part-sectional elevation of the reversing control lever.
Figure 6:
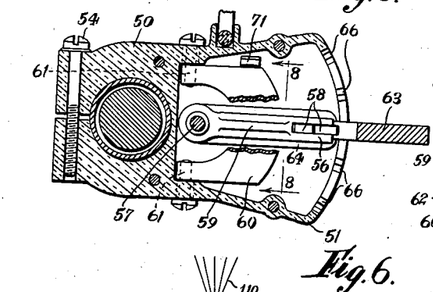

The tumbler 60 is actuated by a push rod 70 pivotally connected to it at 71 and guided at 72 in the casing part 51. The push rod 70 is urged downwards by a spring 73 and is pivoted at 74 to a link 75 having a cam surface 76 and a slot 77. A rocking plate 78 is pivoted at 80 to a bracket 79 and carries a pin 81 engaged in the slot 77 and a pin 82 adapted to engage the cam surface 76. The rocking plate 78 is actuated by a rod 83 having its lower end guided at 84 (Fig. 2) and linked by a rod 85 to the throttle arm 86 of the engine 20. This throttle arm is coupled by a rod 87 to the accelerator pedal 88, the throttle return spring being denoted by 89.

In Fig. 4 the rocking plate 78 is shown in the position it occupies when the accelerator pedal 88 is fully raised and the throttle is in the idling position. It will be observed that in this condition the pin 81 is displaced counterclockwise from the dead-centre position with reference to the pins 74 and 80. The push rod 70 is therefore withdrawn downwards far enough to allow the tumbler 60 to assume its lower, operative position.

In Fig. 2 90 denotes an electrical junction box, 91 the battery of the vehicle, 92 the charging cut-out and 93 the electrical generator.

Figure 10:
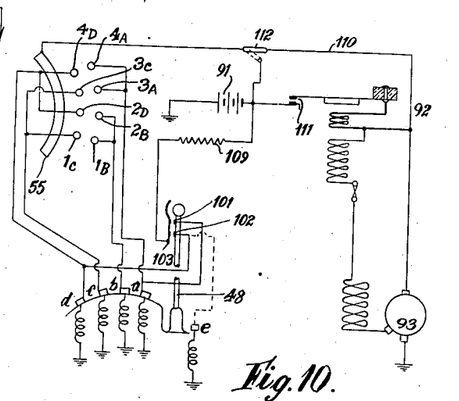
Fig. 10 is an electrical circuit diagram.

When the type of Cotal gear shown in Fig. 1 is driven through a hydraulic coupling, the shaft 30 is rotated by the drag torque of the hydraulic coupling when the engine is idling and the electro-magnet gearing is in neutral, all the electromagnets being de-energized. Changing of the reversing gear under these conditions causes clashing of the planet-carrier teeth 44 with the sector 45 or the annulus 41. This can be avoided by providing on the reversing lever 48 a switch which can be operated to keep engaged one of the forward speeds, preferably direct drive, while the reversing gear is operated. Such a switch is shown in Fig. 9. An insulating block 100 fixed to the gear lever 48 carries two contact studs 101 and 102 electrically connected respectively to the terminals $d$ and $a$ of the gearing. A contact blade 104 having an insulating projection 105 is fixed to a post 103 mounted in the block 100. A hand-lever 106 is fixed to a spring blade 107 in turn fixed by a screw 108 to the gear lever 48. When the levers 106 and 48 are gripped, the blade 107 engages the projection 105 on the contact blade 104 and causes the latter to contact with the studs 101 and 102. The contact post 103 is connected (Fig. 10) to the negative terminal of the battery 91 (the positive terminal of which is grounded) through a resistance 109 which reduces the excitation of the magnets A and D sufficiently to prevent harsh application of the electromagnetic clutches and consequent shock due to the sudden arresting of the runner 25 of the hydraulic coupling that would otherwise occur.

The arcuate contact strip 55 of the preselector controller is connected by a conductor 110 to a point in the charging circuit on the generator side of the contacts 111 of the cut-out. A switch 112 enables the controller to be energized directly from the battery, for example, in the event of breakdown of the generator.

The system operates on forward running as follows. It will be assumed that the vehicle is stationary with the engine idling, that the reversing gear is set for forward running, and that the preselector handle 63 and the brush arm 56 are in the neutral position. The magnets are therefore de-energized, and the coupling runner and parts of the mechanical gearing are spinning idly. The preselector handle is now moved to position 1, the brush arm moving only to position 4 where it is stopped by the step 62a of the tumbler 60, and the spring 69 being strained. The accelerator 88 is now depressed and causes the rocking plate 78 to move clockwise (Fig. 4) bringing the pin 81 thereon over top dead centre and raising the tumbler until the step 62a and the gaps 62 thereon are clear of the rib 59 on the brush arm. This arm now moves over positions 3 and 2 and comes to rest in position 1. It is convenient to arrange that the brush arm is released when the accelerator pedal has been depressed about 10 per cent. of its total travel.

If the coupling runner were suddenly arrested by engagement of first gear in known manner, its inertia would impart a jerk to the vehicle. The improved system reduces this jerk to an unobjectionable value by two means. Firstly, since the electromagnets are supplied with current from the generator side of the cut-out 92, before the engine has attained the speed at which the generator cut-out 92 closes, the voltage available for energizing the electromagnets is less than the battery voltage, so that the magnets are only weakly energized under the idling condition when the torque transmitted by the hydraulic coupling is low. The coupling runner is therefore arrested gradually. Secondly, in moving from neutral towards first-speed position the brush arm is stopped momentarily in the fourth-speed position and the engagement of the electro-magnets A and D arrests the rotation of the runner 25 without objectionable shock since there is no torque multiplication in the gearing and proportionately no high reaction on the vehicle.

As the throttle is opened, the brush arm passes quickly through positions 3 and 2 before stopping in the low gear position, and as the engine accelerates, the cut-out closes, full battery voltage being applied to the magnets B and C, and the torque transmitted by the hydraulic coupling rising to a value sufficient to set the vehicle in motion. Meanwhile, the continued depression of the accelerator pedal has allowed the tumbler 60 to regain its locking position, which is conveniently arranged to occur when the accelerator is 15 per cent. depressed.

Figures 11, 12:
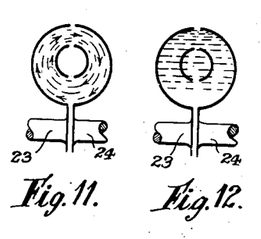
Figs. 11 to 13 are diagrammatic sections showing different operating conditions in the hydraulic coupling.
Figure 13:
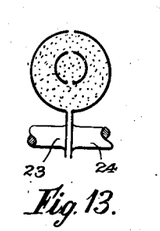

In order to change to a higher speed, say second, the preselector handle is moved to position 2, the brush arm remaining locked in position 1. While the accelerator pedal is still depressed and driving torque is being transmitted, the vortex circulation in the hydraulic coupling is as shown in Fig. 11, where a hollow vortex ring of liquid surrounds a core of air, or of inert liquid if the coupling is completely filled with liquid. If the throttle is now shut, the vehicle begins to overrun the engine and this vortex circulation breaks down; at the instant when the torque is zero the liquid is attempting to collect in a dense ring against the outer boundary of the working circuit while any air that may be normally in the core of the circuit is attempting to collect in the neighborhood of the coupling axis. (If the torque remained at zero, the conditions shown in Fig. 12 would finally be attained.) Therefore during a very short period after the torque has become zero, a confused mixture of liquid and air is formed in the coupling, as shown in Fig. 13. Alternatively, if the coupling contains no air, the vortex ring of liquid is in a collapsed condition or a confused state of motion, as suggested by Fig. 13, instead of the well defined forms in Figs. 11 and 12.

Meanwhile, however, release of the accelerator pedal has raised the tumbler 60 and allowed the brush arm to move to position 2, and magnets B and D are energized while the coupling is still in the condition shown in Fig. 13 in which its torque-transmission capacity is substantially lower than it would be when the vortex ring had been re-established (Fig. 11) or if the dense ring of dead liquid had been formed (Fig. 12). As a result, the shock due to the engagement of the electro-magnets is substantially reduced by ensuring that the operations of torque reversal, disengagement of one speed and re-engagement of the next higher speed take place at the necessary short time intervals. Furthermore, the magnetizing force need not be so powerful as it would have to be if it were required to force the frictional surfaces into synchronous engagement under full torque.

Any changes from a lower to a higher speed while the vehicle is running are made in the manner just described.

In changing from a higher to a lower speed, if driving in traffic, when the vehicle has to slow down or stop, the accelerator may be completely released and thereafter the preselector handle operated to preselect a lower gear. Since the tumbler 60 is now in the locking position, the higher gear remains engaged until the accelerator is again depressed, when the gear change occurs and the vehicle accelerates. Alternatively, when changing to a lower speed, the lower speed may be preselected by the handle 63 while the accelerator is partly depressed, and the change effected by releasing the pedal so that it occurs while the hydraulic coupling is in the condition shown in Fig. 13.

Changing from a higher to a lower speed when the vehicle is required to accelerate rapidly or is climbing a hill fast is preferably effected by preselecting the desired lower speed while the accelerator is almost fully depressed, and thereafter depressing the accelerator to the limit, which causes the pin 82 on the rocking plate 78 (Fig. 4) to strike the cam surface 76 and thus raise the tumbler 60, allowing the gear change to occur. Alternatively, the change down can be made with the accelerator fully depressed, by moving the preselector lever to the desired lower speed position. Under either of these conditions the engine is helped to accelerate by the momentary overrunning torque due to taking up of the drive in the selected lower-speed ratio, and the vortex ring is disrupted by this reversal of torque even although the throttle is kept wide open; hence the take-up of the drive is cushioned by the soft condition of the coupling. It is convenient to arrange that the tumbler is in the locking position while the accelerator is between 15 and 95 per cent. depressed, the last 5 per cent. of downward travel releasing the tumbler.

Figure 14:
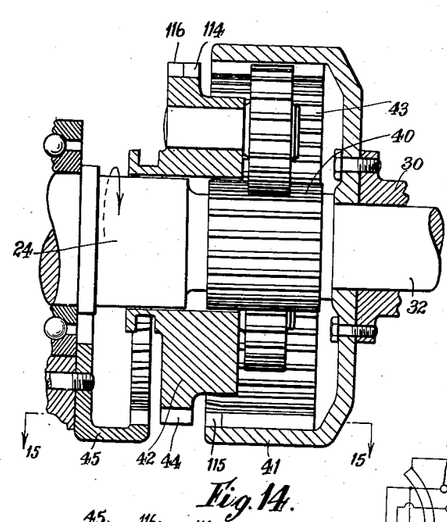
Fig. 14 is a section of the reversing gear, to a larger scale than that of Fig. 1.
Figure 15:
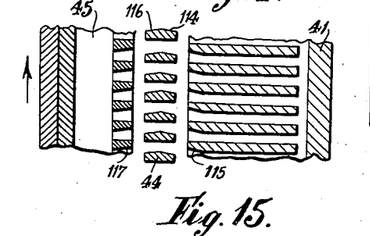
Fig. 15 is a developed section on the line 15—15 in Fig. 14.

The reversing gearing is liable to be difficult to change when the engine is running owing to the drag torque which resists axial movement of the stationary planets 43 and planet-carrier 42 (operation of the handle 106 having engaged direct drive in the four-speed gear to prevent clashing of the reversing-gear teeth). When the planet-carrier teeth 44 (Fig. 14) are in mesh with the annulus gear 41, the planet-carrier tends to overrun the annulus, consequently the leading faces of the rear half of the planet-carrier teeth 44 are preferably backed off by a bevel 114 and the trailing faces of the annulus teeth are similarly bevelled at 115 (Fig. 15). The angle of these bevels is such that the axial component of the force acting between these teeth is equal to, or somewhat more, or less, than the force required to overcome the frictional restraint to sliding of the planet-carrier, due to the clutching teeth 44 and the teeth of the planetary gears 40, 41, 43 when the system is stationary under load. This static friction is substantially higher than the frictional restraint imposed by the drag torque on the teeth once the disengaging movement has been started.

When the planet carrier is in mesh with the stationary sector 45 to yield reverse, it tends to rotate in the forward direction. Consequently the leading faces of the front halves of the teeth 44 are also bevelled at 116 and the co-operating faces of the teeth of the sector 45 are correspondingly bevelled at 117.

Figure 16:
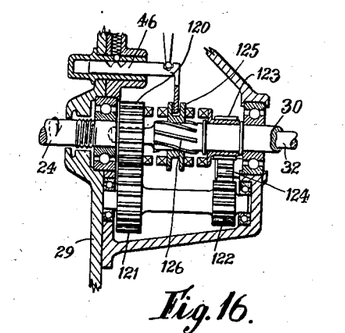
Fig. 16 shows in section an alternative arrangement of reversing gear.

When the vehicle is stationary and the planet-carrier 42 is engaged with either the annulus 41 or the sector 45, with the engine running, as soon as the reversing lever 48 is grasped, the switch handle 106 operates to engage direct drive and thus the coupling runner 25 and all the mechanical gear elements are held stationary. If now the reversing lever 48 is thrown over, the drag torque transmitted by the hydraulic coupling assists in overcoming the static friction acting between the engaged teeth of the reversing gear, and as soon as relative movement occurs between these teeth the friction decreases substantially and the planet-carrier 42 snaps over owing to the action of the spring-loaded ball 47. The engagement of the planet-carrier teeth 44 with the sector or the annulus teeth, as the case may be, being facilitated by the fact that, when the teeth to be engaged meet under drag torque, there is relative axial movement between them and consequently the frictional restraint to sliding of the planet-carrier is substantially lower than it would be under static conditions.

Where the improved system is to be used on a railway vehicle which is required to run normally in both directions, a reversing gear yielding the same speed on forward and reverse running must be substituted for the planetary reversing gear shown in Fig. 1. Such a gear is shown in Fig. 16. The input shaft 24, which is driven by the hydraulic coupling, is integral with a driving gear wheel 120 meshing with a counter-shaft wheel 121. A counter-shaft wheel 122 drives, through an idler wheel 124, a wheel 123 journalled on the hollow shaft 30 which forms the input shaft to the electro-magnetically controlled gearing. A jaw-clutch member 125 is slidable, under control of the reverse selector 46, on helical splines 126 formed on the shaft 30. Two sets of teeth on the member 125 are engageable respectively with teeth on the wheels 120 and 123. The splines 126 have a right-handed helix, so that, when the shaft 24 is urged to rotate in the direction of the arrow thereon, the splines act to produce an axial force on the member 125 which assists disengagement from both forward and reverse positions.

In order to prevent clashing of gear teeth during the changes between forward and reverse, there may be provided means for reducing or eliminating in known manner the rotation due to the idling drag transmitted by the hydraulic coupling, such as a runner brake or a ring valve with a runner brake. Where such means are provided, it is not essential to engage a gear of the forward gearing during operation of the reversing lever. Fig. 3 shows such a runner brake, which is also indicated in Fig. 2. An armature disk 49 splined to but slidable on the shaft 24, cooperates with an electromagnet E fixed to the gear casing 29. One end of the exciting winding of this magnet is grounded, and the other is connected to a terminal e. This terminal is connected (Fig. 10) to the contact stud 102 of the switch on the reversing lever 48, and the conductors shown in Fig. 10 in full lines leading to the studs 101 and 102 may be dispensed with. With this modified arrangement the reversing selector 46a (Fig. 3) may be provided with a middle neutral notch co-operating with the locating ball 47.

Although this invention has been particularly described with reference to a system embodying a hydraulic coupling, it will be apparent that it can also be applied to systems comprising certain kinds of hydraulic torque converters such for example as a converter having a rotary casing fixed to the impeller and a reaction blade ring mounted on a support in the neighbourhood of the axis of rotation.

We claim:

1. A power-transmission system comprising an internal-combustion driving engine having a power control member, a hydraulic power transmitter of the kinetic type and a mechanical change-speed gearing connected in series to said engine, said gearing having constantly-meshed toothed wheels, frictional devices for establishing the different speed ratios therein and control means operatively connected to said frictional devices for selecting changes of gear, characterised by an interlocking connection between said power control member of the engine and said control means of the gearing said interlocking connection including a mechanical interlocking member operatively connected with said power control member and movable between one position in which, when said power control member is set to cause the engine to maintain any substantial amount of power output, said interlocking member engages said control means of the gearing to prevent effective movement of the latter in at least the sense required to effect the engagement of a higher-speed gear, and another position in which, when said power control member is displaced to cause the engine to cease producing torque, said interlocking member ceases to restrain such effective movement of said control means and thus permits completion of such gear changes substantially at the instant when cessation of torque occurs in said hydraulic power transmitter.

2. A power-transmission system comprising an internal-combustion driving engine having a power control member, a hydraulic coupling of the kinetic type, and a planetary change-speed gearing arranged to be driven by said engine through said coupling and having frictional devices and control means therefor for controlling the rotation of elements of the gearing and thereby establishing different speed ratios, characterised by an interlocking connection between said power control member of the engine and said control means of the gearing, said interlocking connection including a mechanical interlocking member operatively connected with said power control member and movable between one position in which, when said power control member is set to cause the engine to maintain any substantial amount of power output, said interlocking member engages said control means of the gearing to prevent effective movement of the latter in at least the sense required to effect the engagement of a higher-speed gear, and another position in which, when said power control member is displaced to cause the engine to cease producing torque, said interlocking member ceases to restrain such effective movement of said control means and thus permits completion of such gear changes substantially at the instant when cessation of torque occurs in said hydraulic coupling.

3. A power-transmission system comprising an internal-combustion driving engine having a power control member, a hydraulic power transmitter of the kinetic type, planetary change-speed gearing connected in series to said engine, said gearing having electro-magnetic devices each comprising metal-to-metal co-operating friction elements forming part of the magnetic circuit of the controlling magnet, and switching means for selectively controlling the excitation of said electro-magnetic devices and thereby establishing different speed ratios, characterised by an interlocking connection between said power control member of the engine and said switching means, which serves to release said switching means for executing changes from any lower- to any higher-speed gear substantially at the instant when cessation of torque occurs in said hydraulic power transmitter.

4. A power-transmission system comprising an internal-combustion driving engine having a power control member, a hydraulic power transmitter of the kinetic type, planetary change-speed gearing connected in series to said engine, said gearing having electro-magnetic devices each comprising metal-to-metal co-operating friction elements forming part of the magnetic circuit of the controlling magnet, and switching means for selectively controlling the excitation of said electro-magnetic devices and thereby establishing different speed ratios, an electrical generator driven by said engine, an accumulator battery, and an electrical cut-out connected between said generator and said battery, characterised in that said switching means are included in an electrical circuit arranged to be energized from said generator and excluding the contacts of said cut-out.

5. A power-transmission system comprising an internal-combustion driving engine having a power control member, a hydraulic power transmitter of the kinetic type, planetary change-speed gearing connected in series to said engine, said gearing having electro-magnetic devices each comprising metal-to-metal co-operating friction elements forming part of the magnetic circuit of the controlling magnet, and switching means for selectively controlling the excitation of said electro-magnetic devices and thereby establishing different speed ratios, an electrical generator driven by said engine, an accumulator battery, and an electrical cut-out connected between said generator and said battery, characterised in that said switch means are included in an electrical circuit arranged to be energized from said generator and excluding the contacts of said cut-out and in that an interlocking connection is provided between said power control member of the engine and said switching means, which serves to release said switching means for executing changes from any lower- to any higher-speed gear substantially at the instant when cessation of torque occurs in said hydraulic power transmitter.

6. A power-transmission system comprising an internal-combustion driving engine having a power control member, a hydraulic power transmitter of the kinetic type, planetary change-speed gearing connected in series to said engine, said gearing having electro-magnetic devices each comprising metal-to-metal cooperating friction elements forming part of the magnetic circuit of the controlling magnet, and switching means for selectively controlling the excitation of said electro-magnetic devices and thereby establishing different speed ratios, characterised in that said switching means include a control lever so arranged that, in moving from the neutral position to a lower-speed gear position, it is constrained to pass through a higher-speed gear position.

7. A power-transmission system comprising an internal-combustion driving engine having a power control member, a hydraulic power transmitter of the kinetic type, planetary change-speed gearing connected in series to said engine, said gearing having electro-magnetic devices each comprising metal-to-metal co-operating friction elements forming part of the magnetic circuit of the controlling magnet, and switching means for selectively controlling the excitation of said electro-magnetic devices and thereby establishing different speed ratios, characterised in that a preselector control member is elastically coupled to said switching means, and that an interlocking connection is provided between said power control member of the engine and said switching means, which serves to release said switching means for executing preselected changes from any lower- to any higher-speed gear substantially at the instant when cessation of torque occurs in said hydraulic power transmitter.

8. A power-transmission system comprising an internal-combustion driving engine having a power control member, a hydraulic power transmitter of the kinetic type, planetary change-speed gearing connected in series to said engine, said gearing having electro-magnetic devices each comprising metal-to-metal co-operating friction elements forming part of the magnetic circuit of the controlling magnet, and switching means for selectively controlling the excitation of said electro-magnetic devices and thereby establishing different speed ratios, characterised in that said switching means include a control member arranged to move successively between the various gear positions in order of speed and to a neutral position disposed beyond the highest-speed gear position, and that an interlocking connection is provided between said power control member of the engine and said switching means, which serves to release said switching means for executing changes from any lower- to any higher-speed gear substantially at the instant when cessation of torque occurs in said hydraulic power transmitter, and which, when in condition to prevent said gear changes, nevertheless permits the change from neutral to the highest-speed ratio.

9. A power-transmission system comprising an internal-combustion driving engine having a power control member, a hydraulic power transmitter of the kinetic type and a mechanical change-speed gearing connected in series to said engine, said gearing having constantly-meshed toothed wheels, frictional devices for establishing the different speed ratios therein and control means operatively connected to said frictional devices for selecting changes of gear, characterised by an interlocking connection between said power control member of the engine and said control means of the gearing, which serves to release said control means for executing at least some of the possible gear changes as said power control member is displaced in the power-decreasing sense near the idling position, and to lock said control means for preventing any gear change from one ratio to another from being executed while said power control member is in said idling position.

10. A power-transmission system comprising an internal-combustion driving engine having a power control member, a hydraulic power transmitter of the kinetic type, planetary change-speed gearing connected in series to said engine, said gearing having electro-magnetic devices each comprising metal-to-metal co-operating friction elements forming part of the magnetic circuit of the controlling magnet, and switching means for selectively controlling the excitation of said electro-magnetic devices and thereby establishing different speed ratios, characterised by a preselector control member which is elastically coupled to said switching means, and an interlocking connection between said power control member of the engine and said switching means, which serves to prevent preselected gear changes from any lower- to any higher-speed gear from occurring while said power control member is in the middle part of its range of movement, and to permit such changes to occur as said power control member comes near to the idling position.

11. A power-transmission system comprising an internal-combustion driving engine having a power control member, a hydraulic power transmitter of the kinetic type, planetary change-speed gearing connected in series to said engine, said gearing having electro-magnetic devices each comprising metal-to-metal co-operating friction elements forming part of the magnetic circuit of the controlling magnet, and switching means for selectively controlling the excitation of said electro-magnetic devices and thereby establishing different speed ratios, characterised by a preselector control member which is elastically coupled to said switching means, and an interlocking connection between said power control member of the engine and said switching means, which serves to prevent preselected gear changes from any lower- to any higher-speed gear from occurring while said power control member is in the middle part of its range of movement, to permit such changes to occur as said power control member comes near to the idling position and to prevent preselected gear changes from at least any higher- to any lower-speed gear from occurring while said power control member is in the idling position.

12. A power-transmission system comprising an internal-combustion driving engine having a power control member, a hydraulic power transmitter of the kinetic type, planetary change-speed gearing connected in series to said engine, said gearing having electro-magnetic devices each comprising metal-to-metal co-operating friction elements forming part of the magnetic circuit of the controlling magnet, and switching means for selectively controlling the excitation of said electro-magnetic devices and thereby establishing different speed ratios, characterised in that a preselector control member is provided which is elastically coupled to said switching means and is arranged to move successively between the various gear positions in order of speed and to a neutral position disposed beyond the highest-speed gear position, and that an interlocking connection is provided between said power control member of the engine and said switching means, which while the engine is idling prevents any gear change from one ratio to another from being executed but permits the change from neutral to the highest speed gear, and which prevents any preselected changes from a lower- to a higher-speed gear from being executed while said power control member is in the middle part of its range of movement, while permitting said last-mentioned changes to occur as said power control member comes near to the idling position.

13. A power-transmission system comprising an internal-combustion driving engine having a power control member, a hydraulic power transmitter of the kinetic type and a mechanical change-speed gearing connected in series to said engine, said gearing having constantly-meshed toothed wheels, frictional devices for establishing the different speed ratios therein and control means operatively connected to said frictional devices for selecting changes of gear, characterised by an interlocking connection between said power control member of the engine and said control means of the gearing, which serves to release said control means for executing at least some of the possible gear changes substantially at the instant when cessation of torque occurs in said hydraulic power transmitter and which serves to release said control means for executing at least changes from a higher- to a lower-speed gear on movement of said power control member over the final part of its range in the power-increasing sense.

14. A power-transmission system comprising an internal-combustion driving engine having a power control member, a hydraulic coupling of the kinetic type, and a planetary change-speed gearing arranged to be driven by said engine through said coupling, said gearing having electro-magnetic devices each comprising metal-to-metal co-operating friction elements forming part of the magnetic circuit of the controlling magnet, switching means for selectively controlling the excitation of said electro-magnetic devices and thereby establishing different speed ratios, characterised by a preselector controller elastically coupled to said switching means and an interlocking connection between said power control member of the engine and said switching means, which serves to release said switching means for executing at least some of the possible preselected gear changes substantially at the instant when the torque transmitted by said hydraulic coupling ceases owing to actuation of said power control member.

15. In a vehicle having an internal-combustion engine, a power transmission system comprising a hydraulic power transmitter of the kinetic type connected to said engine, a main change-speed gearing having frictional devices operable for establishing the different speed ratios therein and yielding a neutral condition, an auxiliary change-speed gearing adapted to be changed by the disengagement and engagement of co-operating teeth and having a gear-change lever, said additional gearing serving to connect said hydraulic power transmitter to said main gearing, and means associated with said gear-change lever for arresting rotation of the driven parts of said hydraulic power transmitter during gear-changing in said auxiliary gearing while said engine is running and said vehicle is stationary.

16. A power-transmission system comprising an engine adapted to rotate continuously, a hydraulic power-transmitter of the kinetic type having a driving part connected to said engine and a driven part, and a change-speed gearing connected to said driven part and having a driven shaft and gear-engaging means which resist disengagement when subjected to torque-loading, wherein said gear-engaging means comprise a slidable clutch member having torque-transmitting faces so inclined that, on disengagement of said means under the torque due to drag in said transmitter when said engine is running and said driven shaft is stalled, said driven part of the transmitter is permitted, in consequence of sliding of said clutch member, to rotate fractionally in the forward direction and so transmit energy which assists disengagement of said means.

17. A power transmission system comprising an internal-combustion engine, a hydraulic power-transmitter of the kinetic type having a driven part, and a change-speed gearing connected to said driven part and having a driven shaft and two sets of co-operating teeth adapted to be disengaged in the course of gear changing, wherein the teeth of at least one of said sets are backed off on the faces that transmit the torque due to drag in said transmitter when said engine is running and said driven shaft is stalled, the angle of backing-off being such as to promote disengagement of said teeth under drag torque.

18. A power-transmission system comprising an internal-combustion engine, a hydraulic power-transmitter of the kinetic type having a driven part, and a change-speed gearing connected to said driven part and having a driven shaft and two co-operating toothed members one of which is slidable, in the course of gear changing, on a torque-transmitting element of said gearing out of mesh with the other of said toothed members, wherein said slidable toothed member is constrained to move obliquely in relation to said torque-transmitting element in such a direction as to promote disengagement of said toothed members under torque loading due to drag in said transmitter when said engine is running and said driven shaft is stalled.

19. A power-transmission system comprising an internal-combustion driving engine having a power control member, a hydraulic coupling of the kinetic type, and a planetary change-speed gearing arranged to be driven by said engine through said coupling, said gearing having electro-magnetic devices each comprising metal-to-metal co-operating friction elements forming part of the magnetic circuit of the controlling magnet, switching means for selectively controlling the excitation of said electro-magnetic devices and thereby establishing different speed ratios, a preselector controller elastically coupled to said switching means, an interlocking connection between said power control member of the engine and said switching means, which serves to release said switching means for executing at least some of the possible preselected gear changes substantially at the instant when the torque transmitted by said hydraulic coupling ceases owing to actuation of said power control member, a reversing gear disposed between said hydraulic coupling and said planetary gearing, a control member for said reversing gear, a brake for arresting the driven part of said hydraulic coupling, and a control member for said brake mounted on said reversing control member.

20. In a vehicle, an internal-combustion engine having a power control member, multi-ratio gearing capable of being shifted while running and having a control member operable for preselecting gear changes and gear actuating means for effecting preselected gear changes, a hydraulic power transmitter of the kinetic type having an impeller element connected to said engine and a runner element connected to said gearing, said elements constituting a working chamber in which a vortex circulation of working liquid exists in consequence of the transmission of driving torque by said transmitter, and an operative connection between said power control member and said gear actuating means, said connection including a mechanical interlocking member movable by said power control member transversely of the path of said gear actuating means between one position in which, when said power control member is set to maintain any substantial degree of power output, said interlocking member forms an abutment for preventing movement of said gear actuating means in at least the sense appropriate for the execution of preselected gear changes from a lower- to a higher-speed gear, and another position in which, when said power control member is displaced to reverse the torque acting between said engine and said transmitter and thereby interrupt said vortex circulation, said interlocking member is also displaced to permit simultaneously such movement of the gear actuating means.

21. In a vehicle having an internal-combustion engine, a power transmission system comprising a hydraulic power transmitter of the kinetic type connected to said engine, a main change-speed gearing of the planetary type having electro-magnetically controlled frictional devices operable for establishing different speed ratios therein, an auxiliary reversing gearing adapted to be changed by the disengagement and engagement of cooperating teeth and having a reversing control lever, said two gearings being connected in series behind said hydraulic power transmitter, and electrical switching means operable as a preliminary to shifting said reversing control lever, for energizing a selection of said frictional devices and thereby arresting rotation of the driven parts of said hydraulic power transmitter during gear changing in said reversing while said engine is running and said vehicle is stationary.

HAROLD SINCLAIR.
ROBERT CECIL CLERK.